July 7, 1942.   W. J. C. MEARS   2,288,912
ELECTRIC AIR VALVE
Filed Oct. 21, 1940

William J. C. Mears
INVENTOR
BY Victor J. Evans & Co.
ATTORNEYS

Patented July 7, 1942

2,288,912

UNITED STATES PATENT OFFICE 2,288,912

ELECTRIC AIR VALVE

William J. C. Mears, Melfa, Va.

Application October 21, 1940, Serial No. 362,151

2 Claims. (Cl. 137—139)

This invention relates to booster valves, and more particularly to those for use with automotive vehicles to apply additional pressure to the brake.

I realize that valves of this type have long occupied the attention of inventors. They have as their primary idea the opening of a valve, electrically, to send air pressure to the brakes to operate a piston and augment the power of the foot brake and cause a quicker stop. However, so far as I am aware, no one has produced a valve having the unique advantages of the structure embodied in my invention.

The object of my invention is an efficient electrically operated air valve.

Another object is a valve that will accomplish the above result and still have simplicity of manufacture and assembly and ease of operation.

These and other objects may be accomplished by my invention which embodies among its features a casing provided on its lower side with an outer annular flange, the removable top of the casing being equal in diameter to the flange at the bottom of the casing. There is a flange on the lower side of the top which surrounds the casing. There are parts in the top and bottom of the casing, with seats formed thereon, and the port at the bottom leads to a nipple connected with the manifold of the engine. The upper port leads to the atmosphere, and an additional nipple leads laterally from the casing and is connected to the booster. A valve disc is positioned to operate between the two seats on the ports with a solenoid above the casing operating the disc so that pressure on the brake pedal closes the atmosphere port and opens the manifold port, sending the pressure to the booster.

Figure 1:
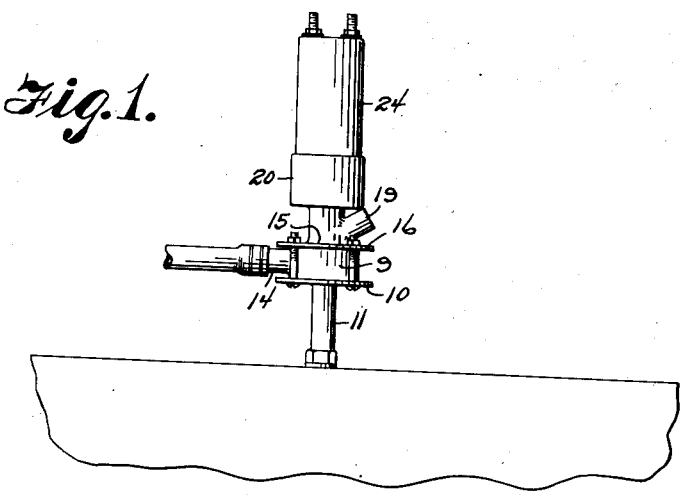
Figure 2:
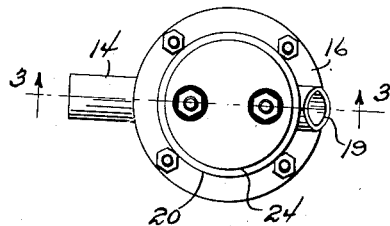
Figure 3:
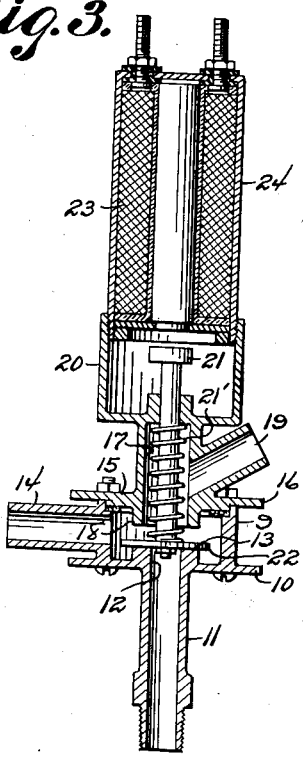

Other objects and features will become evident from the following disclosure when taken in connection with the accompanying drawing, in which:

Figure 1 is a side view of my valve unit in position, screwed onto the manifold, Figure 2 is a plan view of the device shown in Figure 1, and Figure 3 is a vertical cross section of the device shown in Figure 1.

Referring to the drawing in detail, my improved valve consists of a lower casing 10 which is made integral with nipple 11, threaded to screw onto the manifold. Casing 9 has, formed in its bottom, port 12 which leads to nipple 11 and is formed into an upraised valve seat 13. The side of the casing extends directly upward and is formed with a seat on its upper edge to receive the cover of the casing. Extending laterally from the casing and formed integral therewith is a nipple 14, to which it is intended to attach a hose leading to the booster cylinder.

The casing cover 15 is also of integral construction and has an annular depressed center adapted to fit into the seat on the upper edge of the casing 9, and is formed with a flange 16 coextensive with the flange 10. Bolts through these flanges hold the cover on the casing. In the center of the cover there is an upraised port 17 formed into a valve seat 18, the port having, made integral therewith, an exhaust outlet 19 extending off at an angle and the upper end of the port 17 carries a housing 20.

An armature 21 is slidably positioned in port 17 and controls the valve disc 22, being held normally down by coil spring 21.

It will be noted that when the disc 22 is in lower position, as shown, nipple 11 is closed off and nipple 14 is open to the atmosphere through exhaust 19. Then the booster cylinder may empty to release the brakes. However, when the disc 22 is raised by plunger 21, so that it opens port 12 and closes port 17, the outlet 19 is closed off and pressure from nipple 11 goes into nipple 14. From thence it goes to the booster cylinder to apply the brakes.

To operate this device, I provide an electromagnet 23, carried by a protective casing 24, fitted into housing 20. The magnet operates plunger 21 in conventional manner, and I contemplate attaching it in the circuit of the brake light, or, if desired, providing a switch on the control board or in some other suitable position. Accordingly, I have produced a compact and easily manufactured valve which is easily attached and produces efficient results. Although a preferred embodiment is described herein, I do not wish to be limited thereto but only by the scope of the appended claims.

What is claimed is:

1. In a booster valve, a valve chamber composed of separable sections comprising a flat bottom plate having a center inlet opening, a feed conduit connected to the said plate in registration with the opening, an annular seat forming boss formed on the inner side of the said plate about the said opening, a cylindrical wall formed concentrically on the said plate and spaced from the peripheral edge thereof, the said wall having an outlet port formed therein in communication with the laterally extending discharge conduit, a flat top plate at the inner portion of the chamber corresponding to and parallel with the said bottom plate, the said top plate being disposed in abutting relation with the inner edge of the cylindrical wall, a plurality of bolts extended through the projecting marginal portions of the said top and bottom plates exteriorly of the cylindrical wall for detachably connecting the said chamber forming sections in assembly, the said top plate having a center opening in axial alignment with the opening in the bottom plate, a tubular section extending axially from and in registration with the said opening in the top plate, an annular boss formed on the inner side of the top plate about the center opening therein, the said tubular section having an inclined passage through one side thereof opening into the interior of the section, a housing of enlarged diameter formed on the outer end of the said tubular section supporting an electro-magnet, a plunger rod mounted for axial sliding movement in the tubular section and projecting into the diametrically enlarged housing, an armature secured on the said projecting end of the plunger rod in coacting relation with the said electro-magnet, a flat valve secured to the inner end of the plunger rod operable to seat against the boss on the top plate to close the bore of the tubular section when the plunger rod is elevated by the electro-magnet, and a compression spring coiled about the plunger rod between the said valve and the upper portion of the tubular section yieldingly urging the said valve to a position seated on the boss of the bottom plate to close the inlet opening therein.

2. In a booster valve, a valve chamber having a flat circular bottom plate, a cylindrical wall formed on the said plate inwardly of its peripheral edge to form a protruding marginal flange, a flat cover plate fitted on the opposite end of the cylindrical wall having a marginal flange projecting therefrom, a plurality of fastening bolts extended through the said projecting flanges of the bottom and cover plates releasably securing the same in casing forming assembly, the said bottom plate having an inlet port and the wall of the casing having an outlet port, a tubular section extending axially from the said cover opening into the top of the casing, a nipple formed at one side of the said section opening therein for communication with the interior of the casing, a housing of enlarged diameter formed on the outer end of the tubular section, a plunger extending axially through the tubular section and slidable therein, a valve fixed on one end of the plunger and movable therewith to selectively close the top and bottom inlet ports in the casing, a spring sleeved about the plunger for yieldingly urging the valve thereof to outward position to close the inlet port in the bottom plate, the opposite end of the plunger projecting into the said housing, an armature secured on the said opposite end of the plunger within the housing, a tubular casing attached to the outer end of the housing, and an electro-magnet in the said last mentioned casing disposed to co-act with the armature on the plunger for operation of the valve.

WILLIAM J. C. MEARS.